United States Patent [19]

Bruer et al.

[11] 3,789,160

[45] Jan. 29, 1974

[54] DICTATION APPARATUS WITH DISC LOADING, FEEDING, AND EJECTING FEATURE

[75] Inventors: James D. Bruer, Leander, Tex.; Donald L. Buddington, Versailles, Ky.; Walter F. Klein, Austin, Tex.

[73] Assignee: International Business Machines Corporation, Armonk, N.Y.

[22] Filed: Dec. 20, 1971

[21] Appl. No.: 209,800

[52] U.S. Cl. .. 179/100.2 Z, 179/100.1 DR, 274/4 J, 340/174.1 C

[51] Int. Cl. .......... G11b 23/04, G11b 25/04

[58] Field of Search ....... 179/100.2 Z; 340/174.1 C; 206/62 P, 62 R, DIG. 33, DIG. 36; 274/42 P, 4 H, 4 J

[56] References Cited

UNITED STATES PATENTS

| | | | |
|---|---|---|---|
| 3,662,360 | 5/1972 | Lambert | 340/174.1 C |
| 3,495,902 | 2/1970 | Michniewicz | 206/62 R |
| 3,471,654 | 10/1969 | Dollenmayer | 179/100.1 DR |
| 3,416,150 | 12/1968 | Lindberg | 179/100.2 Z |
| 3,609,722 | 9/1971 | Zenzefilis | 179/100.2 Z |
| 3,070,374 | 12/1962 | Nakamatsu | 274/4 J |
| 3,056,134 | 9/1962 | Beyer | 274/4 J |

*Primary Examiner*—Bernard Konick
*Assistant Examiner*—Alfred H. Eddleman
*Attorney, Agent, or Firm*—D. Kendall Cooper; James H. Barksdale, Jr.

[57] ABSTRACT

The present invention concerns dictation and transcription apparatus having convenient and efficient structures for loading, feeding, and ejecting disc record members. In exemplary embodiments, the disc record members are stored in a disc cartridge enabling convenient transportation and storage when not in use. Both dictation and transcription apparatus are provided with a load station, a record/playback station, and an eject (unload) station. Provision is made in the apparatus for accommodating any of a plurality of standard disc cartridges at the load station enabling convenient manual loading by an operator of the apparatus. Following the loading of discs into the apparatus, the cartridge is thereupon moved to the eject (unload) station and serves to receive the discs, one by one, as they are processed in the apparatus.

23 Claims, 24 Drawing Figures

PATENTED JAN 29 1974 3,789,160

SHEET 3 OF 9

DICTATION APPARATUS WITH DISC LOADING, FEEDING, AND EJECTING FEATURE

BACKGROUND OF INVENTION, FIELD, AND PRIOR ART

Pending IMB Patent Applications

Application Ser. No. 877,313, filed Nov. 17, 1969, now U.S. Pat. No. 3,599,989, issued Aug. 17, 1971, N. K. Perkins, et al., inventors; entitled: "Constant Time Measured Review." Assigned to the same assignee as the present application.

Application Ser. No. 99,568, filed Dec. 18, 1970 now U.S. Pat. No. 3,729,201, W. L. Dollenmayer, inventor; entitled: "Unique Pressure Pad for Minature Disk Recorder." Assigned to the same assignee as the present application.

Application Ser. No. 699,259, filed Jan. 19, 1968, now U.S. Pat. No. 3,623,735, issued Nov. 30, 1971, B. F. Wehmer, et al. inventors; entitled: "Dictating and Transcribing Apparatus with Automatic and Semi-Automatic Operator-Controlled Facilities." Assigned to the same assignee as the present application.

Application Ser. No. 209,667 filed concurrently herewith now U.S. Pat. No. 3,730,602; inventors: Jesse L. Campbell, et al., and entitled "Cartridge Particularly Suitable for Disc Record Member." Assigned to the same assignee as the present application.

Application Ser. No. 157,566, filed June 28, 1971, now abandoned Frank E. Becker, inventor; entitled: "Audible Indexing for Dictation Apparatus." Assigned to the same assignee as the present application.

The above-listed patent applications and patent are cited for reference purposes as representing apparatus utilizing disc record members with possible adaptation for use of the invention set forth in the present case.

Publications

Books

"Magnetic Recording," author: S. J. Begun, published by Rinehart and Company, Inc., copyright 1949.

"Disc Recording and Reproduction," author: P. J. Guy; published by Focal Press, copyright 1964.

"Magnetic Recording Handbook," author: R. E. B. Hickman; published by George Newnes Ltd., copyright 1956.

"The Recording and Reproduction of Sound," author: O. Read; published by Howard W. Sams and Co., Inc., copyright 1952.

"Magnetic Recording Techniques," author: W. E. Stewart; published by McGraw-Hill Book Company, Inc., copyright 1958.

"The Audio Cyclopedia," author: H. M. Tremaine; published by The Bobbs-Merrill Company, Inc., copyright 1959.

The foregoing books are of interest since they describe mechanisms useful in a disc-type dictation machine including disc driving mechanisms, disc indexing mechansims, record/reproduce circuits, and various commercial embodiments, none of which are deemed anticipatory of the inventive arrangements set forth in the present case. These references are discussed in greater detail in the pending Becker application.

Some effort has been made in connection with prior apparatus to automate the processing of record members in dictation and transcribing apparatus, including the processing of belts, tapes, and discs. However, the prime effort has been in connection with tapes and particularly with the development of the self-contained cartridges or cassettes of recent years. These provide a measure of convenience in storing, loading, and unloading the record member. Insofar as can be determined, no such efforts have been extended to disc record members.

SUMMARY OF THE INVENTION

Accordingly, the present invention concerns itself with the automating of the loading, feeding, and unloading operations to enable a more efficient and convenient processing of disc record members in connection with audio recording and playback activities. Apparatus according to the present invention comprises the customary recording and playback circuits together with operator control adjuncts for establishing modes of operation, indexing, etc. but is primarily concerned with the loading, feeding, and unloading of disc record members during operation of the apparatus. The apparatus generally comprises a load station, a record/-playback station, and an unload (eject) station arranged in a linear arrangement to facilitate straight-line feeding of disc record members during operation of the apparatus.

In use, the dictator or transcriptionist, as the case may be, places a disc cartridge next to the load station, manually feeds in one or more discs into the load station, and thereafter places the empty cartridge in the eject station where it is then ready to receive the individual discs as processing of the discs, that is recording or playback of information, is completed. In a first version of the invention, facilities are provided for the operator to manually feed discs from station to station in the apparatus along the linear path, that is, from the load station to the record/playback station, and thence to the eject station. It is contemplated that as a disc is fed from the load station to the record/playback station, another disc is concurrently fed from the record/-playback station to the eject station. In another version, facilities are provided for automating the feeding operation in the form of relay-motor structures operable to perform the feeding of discs from load station to record/playback station and from record/playback station to eject station. A suitable cartridge may take the form of the cartridge set out in the Campbell, et al, case referred to previously. Such a cartridge has an entry slot for receiving discs one a time, a central storage area for accommodating one or more discs, an eject slot enabling the movement of discs out from the cartridge into an associated apparatus, such as that taught in the present case. Structures in the form of a slider and knob are provided for the manual loading operation described herein.

Objects

The primary object of the present invention is to provide apparatus utilizing disc record members and having facilities that enable the loading, feeding, and unloading of record members in a highly efficient and convenient manner. A further object of the present invention is to provide apparatus of this nature that is cooperative with a separate disc cartridge for the intended loading, and unloading functions.

Another object of the present invention is to provide a method of loading, feeding, and ejecting disc record members in conjunction with recording and playback of signals, such as in dictation and transcription apparatus. Also, an object of the present invention is to provide apparatus of this nature in which certain steps of the process, such as the feeding of discs during use in the machine, is automated, relieving the operator of the responsibility for determining when discs have been fed properly, or of determining when no further discs remain for processing such as during recording and playback of signals, etc.

Also, an object of the present invention is to provide a unique system for processing of record members during a wide range of activities including dictation of material, storage of the record members, transcription of the materials, manipulation of the record members, etc., while inherently maintaining the proper record sequence, thus creating a highly efficient system for processing of information.

The foregoing and other objects, features, and advantages of the invention will be apparent from the following more particular description of various embodiments of the invention as illustrated in the accompanying drawings.

DRAWINGS

Figures 1, 2, 3A, 3B:
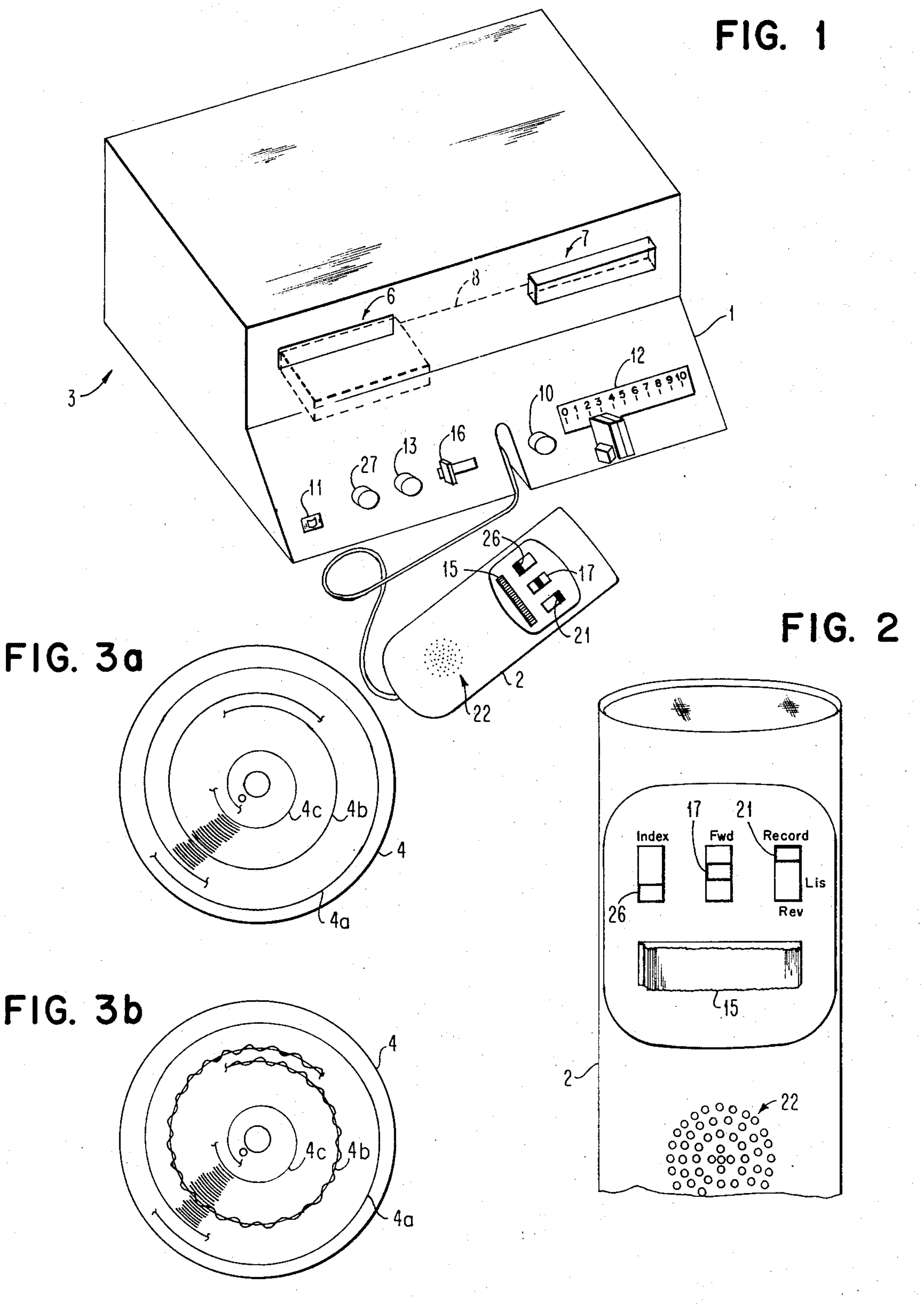
FIG. 1 represents an office type dictation machine having provision for loading, feeding, and unloading of magnetic disc record members and control of recording and reproducing of information, as well as indexing, by means of a microphone.
FIG. 2 illustrates a portion of the microphone shown in FIG. 1 in greater detail.

FIG. 3*a* and 3*b* illustrate disc record members usable in the apparatus of FIG. 1 with FIG. 3*b* illustrating the superimposition of a tone signal for instruction purposes.

Figure 4:
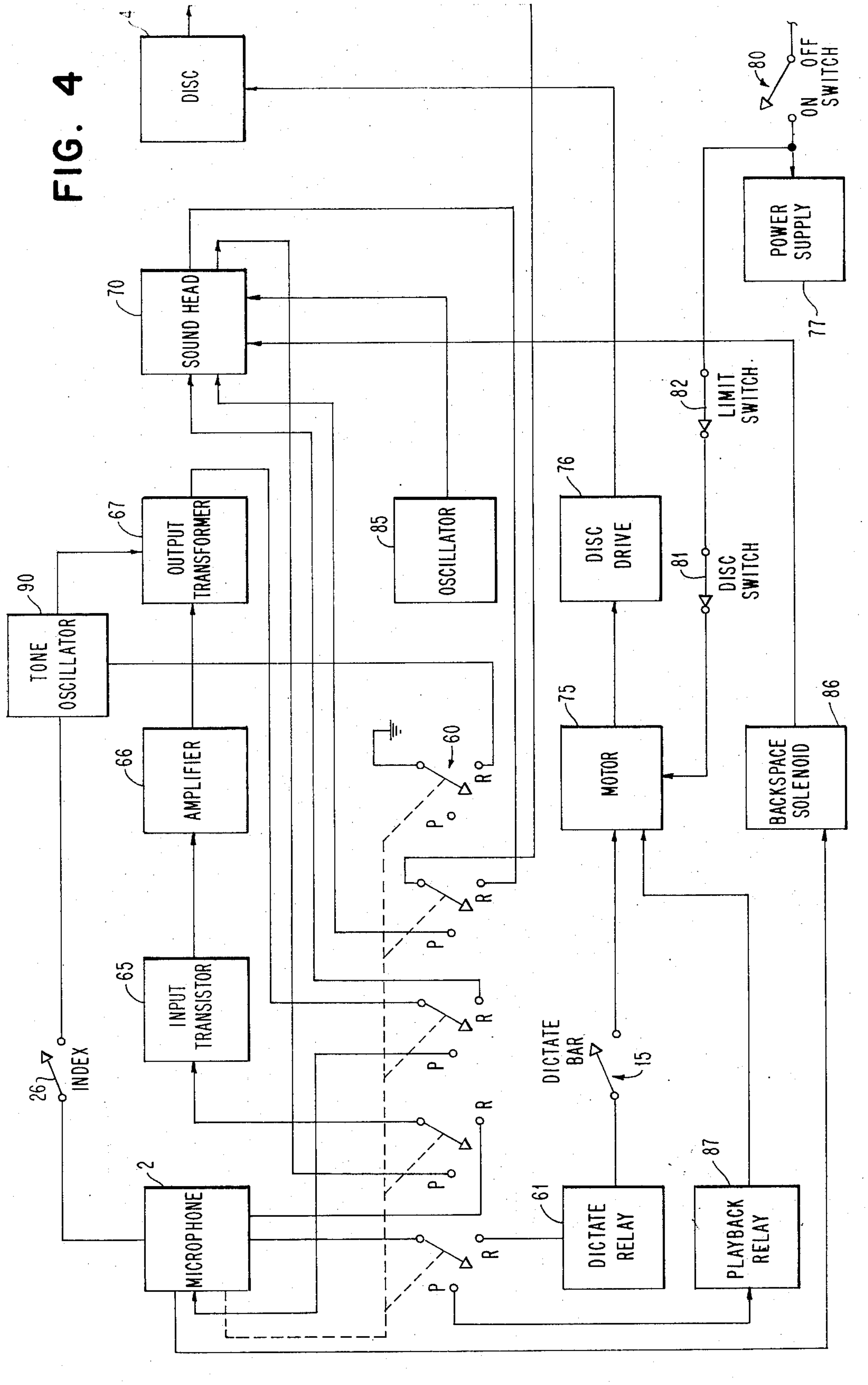

FIG. 4 sets forth a circuit that is useful in the apparatus of FIG. 1.

Figure 5:
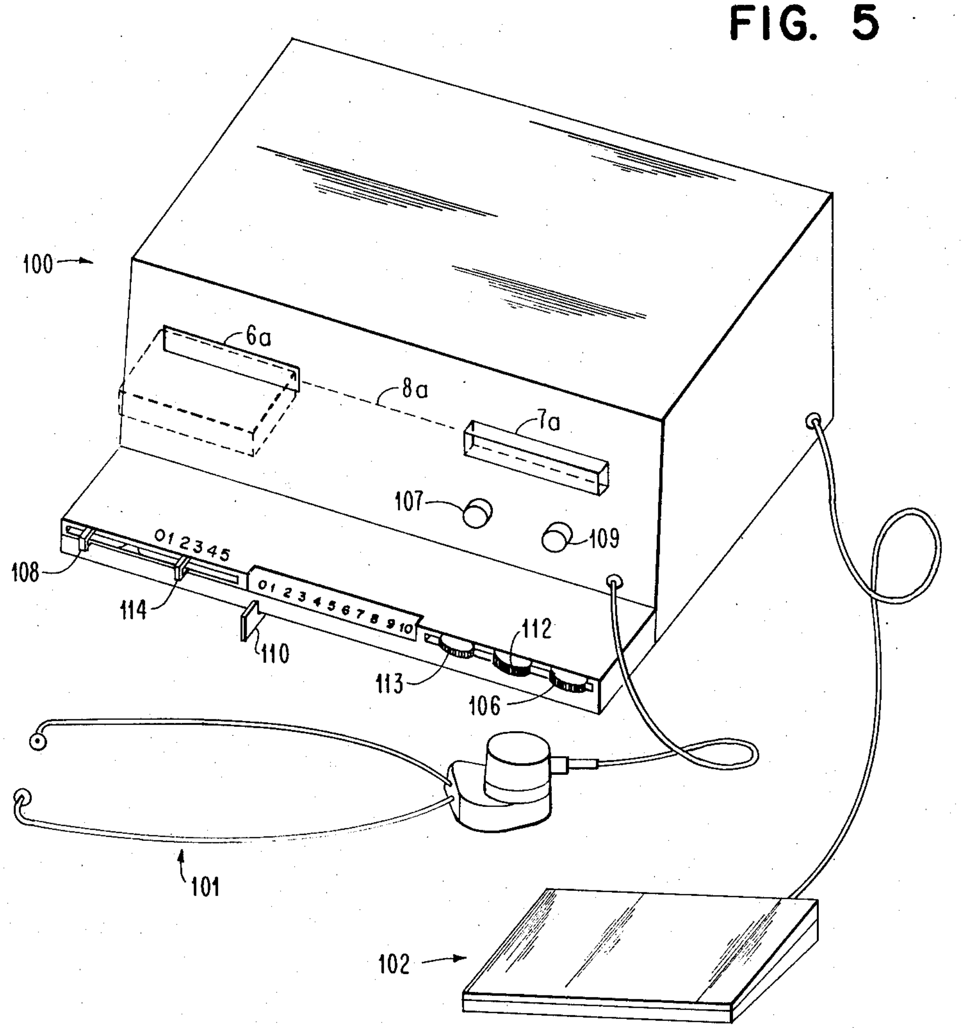

FIG. 5 illustrates a transcribing apparatus for disc-type record media such as those shown in FIGS. 3*a* and 3*b* and having an associated head set and transcriber foot control.

Figure 6:
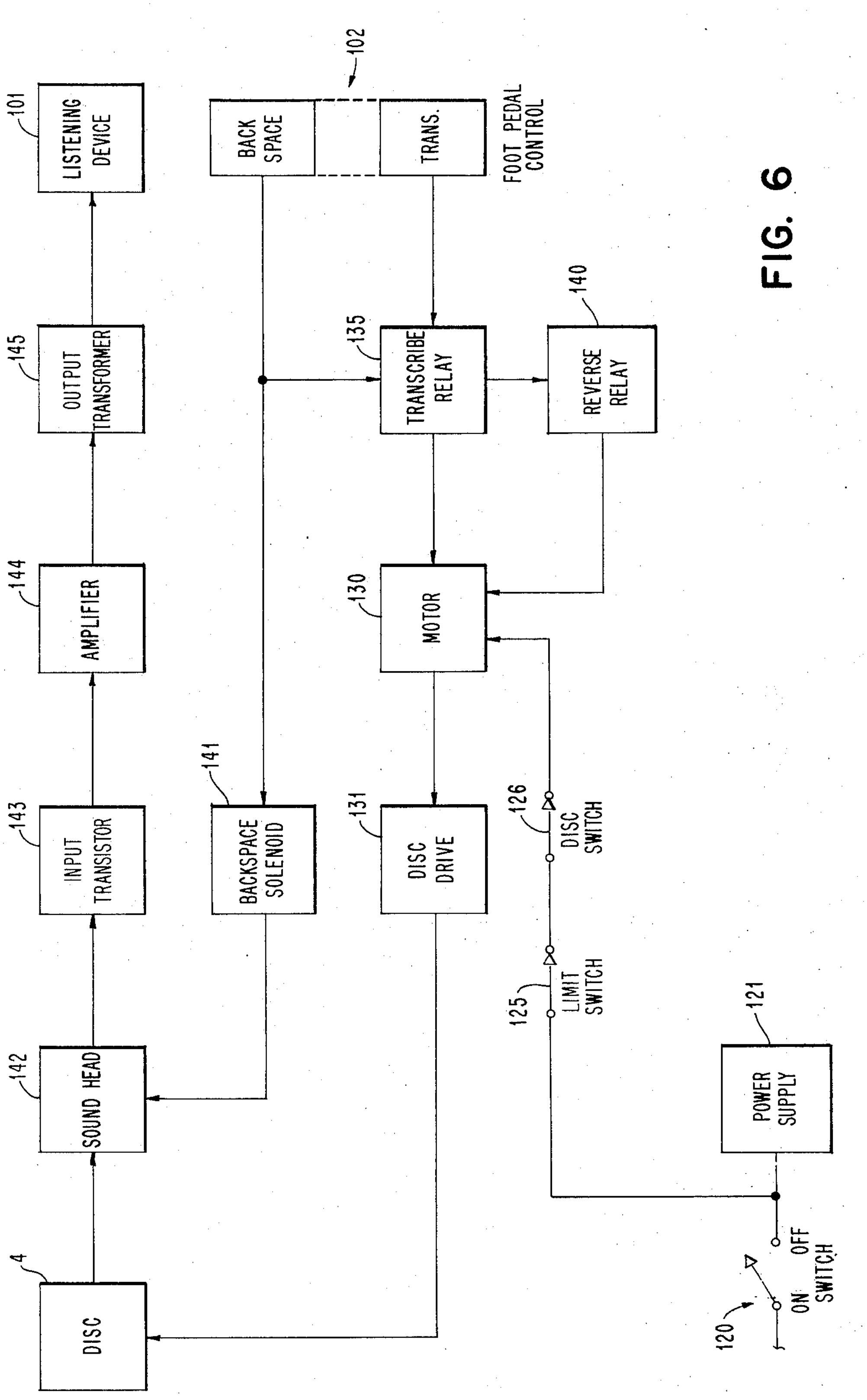

FIG. 6 illustrates a possible circuit for use in the transcribing unit of FIG. 5.

Figure 7:
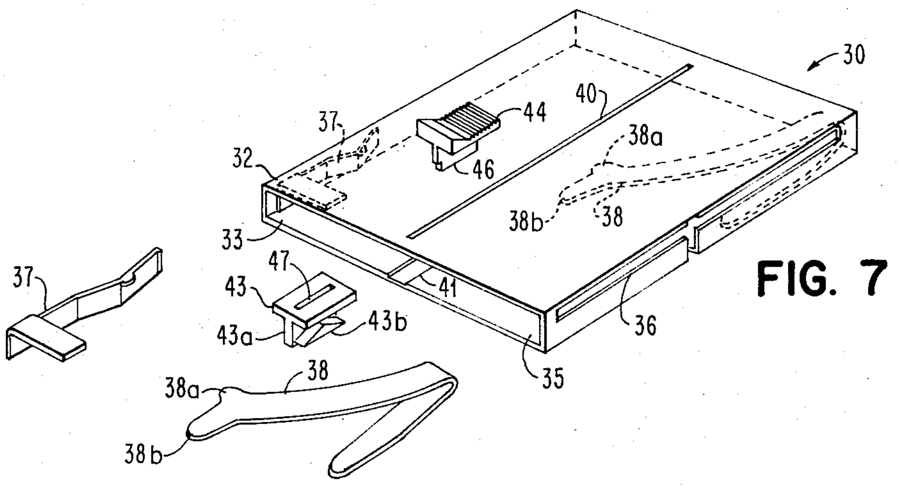

FIG. 7 is a front perspective view of a disc cartridge in accordance with the present invention, showing a manual control means for controlling ejection and entry of discs into the cartridge.

Figure 8:
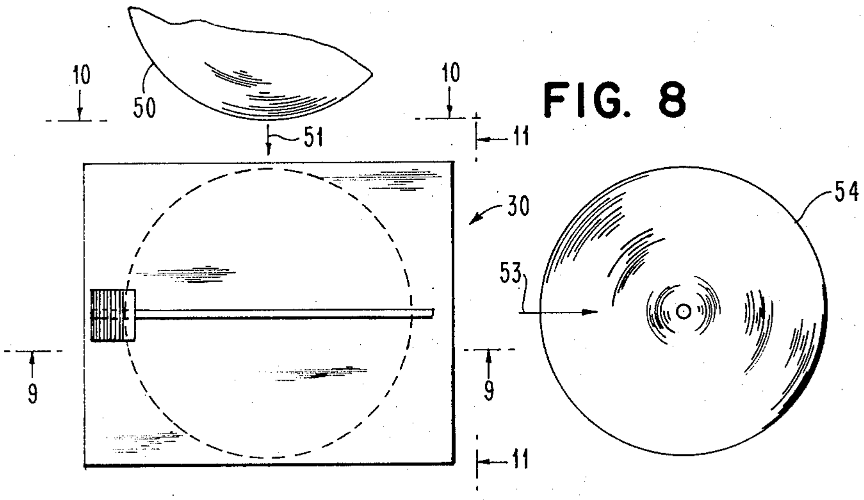

FIG. 8 represents a top elevation of the cartridge of FIG. 7 showing a preferred direction of entry of a disc into the cartridge, a disc in storage position, and a preferred direction of disc ejection from the cartridge.

Figure 9:
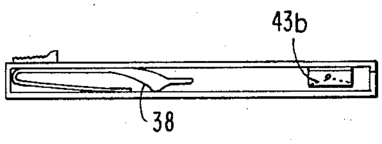

FIG. 9 is a cross-sectional view of the cartridge of FIG. 1 on the line 9—9, FIG. 8.

Figure 10:

FIG. 10 is a right side elevation of the cartridge on the line 10—10, FIG. 8.

Figure 11:
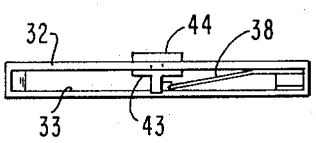

FIG. 11 is a front elevation of the cartridge on the line 11—11, FIG. 8.

Figure 12:
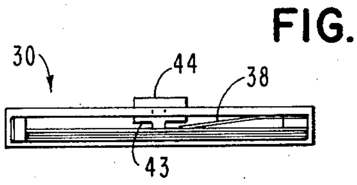

FIG. 12 is a front elevation that is similar to FIG. 11, with the exception that it shows a plurality of discs in position in the cartridge.

Figures 13, 14:
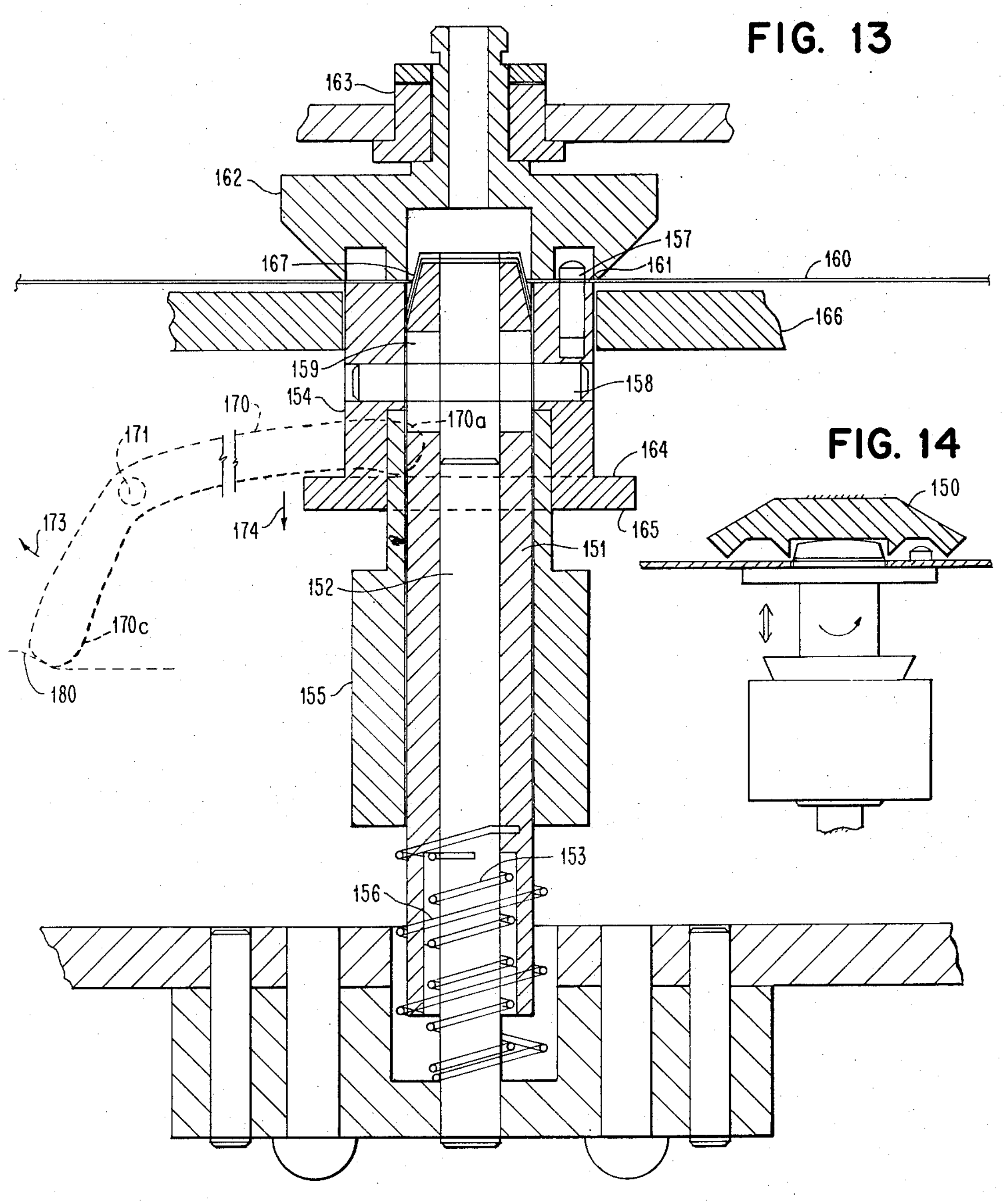

FIG. 13 represents spindle structures useful in the apparatus of FIGS. 1 and 5 particularly in connection with precisely registering disc record members.

FIG. 14 shows a prior spindle structure.

Figure 15:
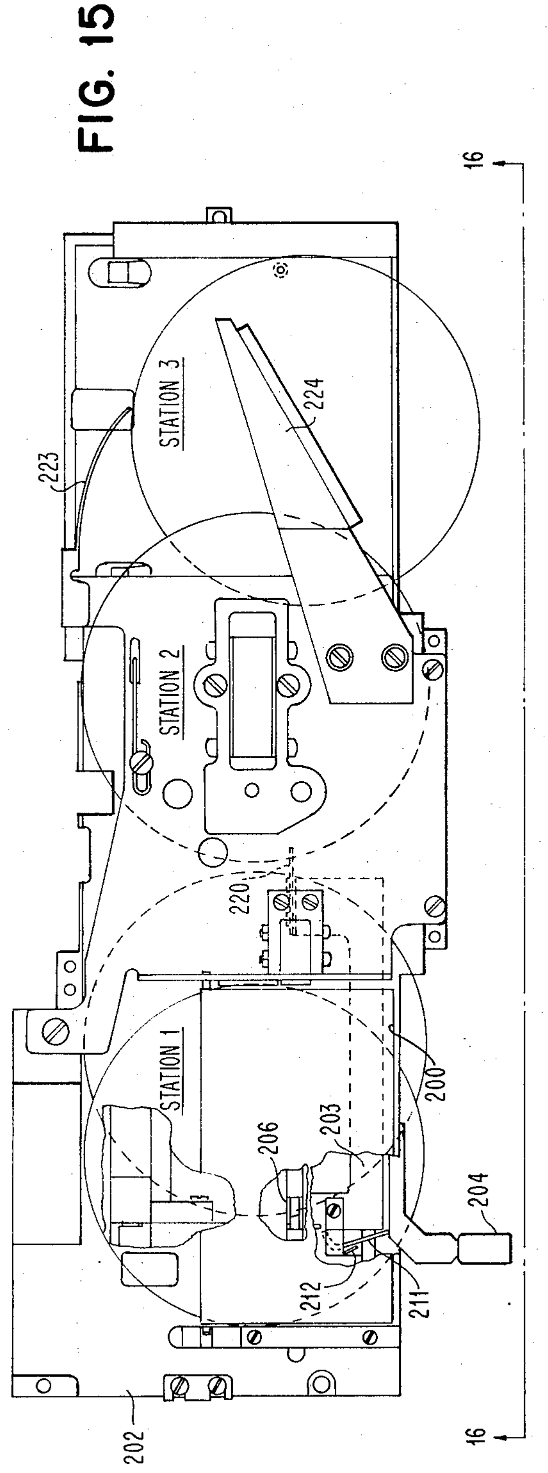

FIG. 15 is a top elevation of a mechanism for loading, feeding, and unloading of disc record members with both loading and feeding being performed manually under control of the user of the equipment.

Figure 16:
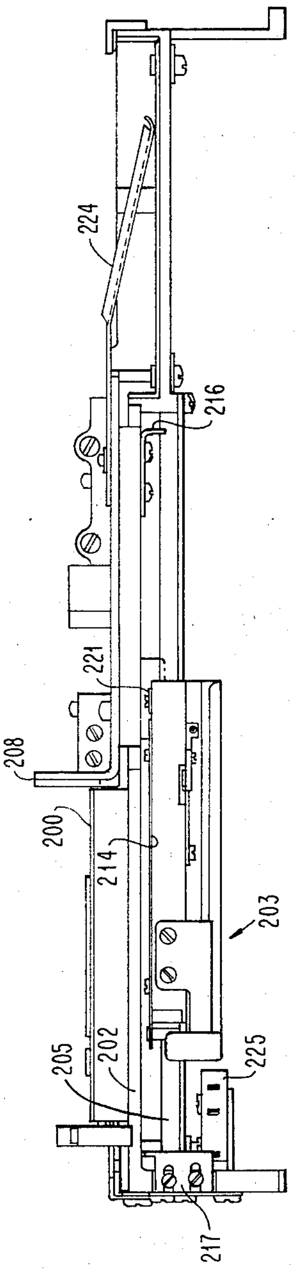

FIG. 16 is a front elevation of the mechanism of FIG. 15 on the line 16—16, FIG. 15.

Figure 17:
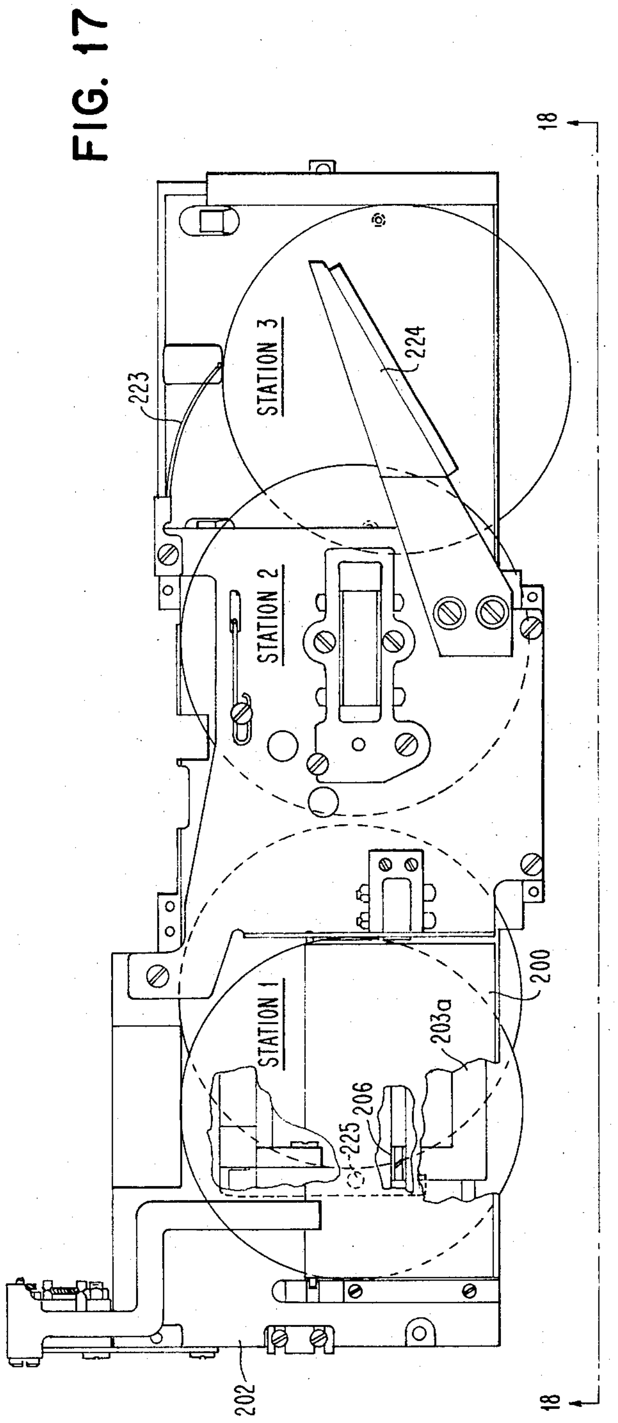
Figure 18:
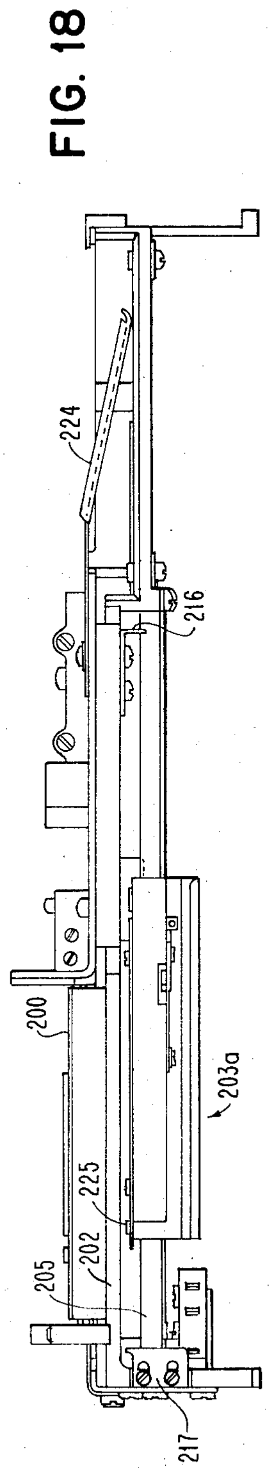

FIGS. 17 and 18 represent another structure for loading, feeding, and unloading of disc record members, but contemplates manual loading plus automatic feeding of the disc record members from station to station during operation of the apparatus.

Figure 19:
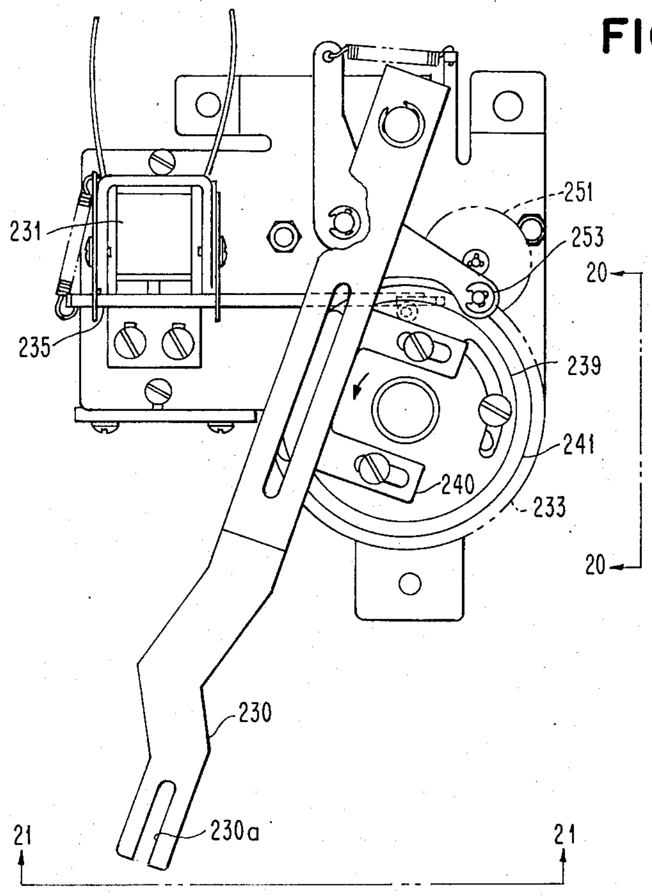

FIG. 19 represents motor, clutch, and relay structures intended for use with the structures of FIGS. 17 and 18 for accomplishing automatic feeding of discs from station to station.

Figure 20:
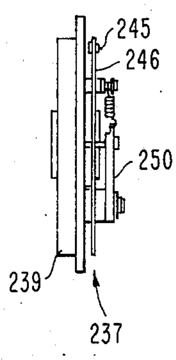
Figure 21:
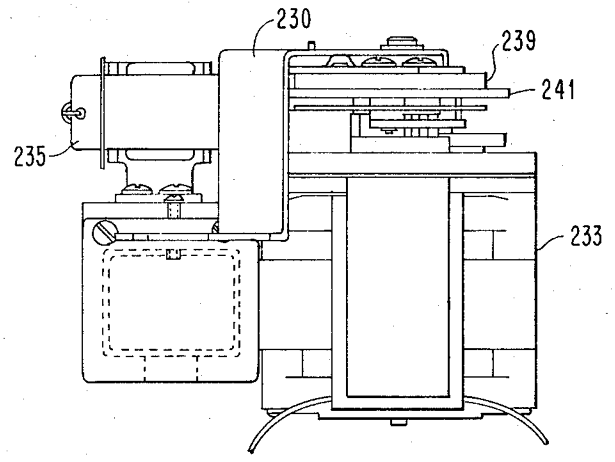

FIGS. 20 and 21, (on the lines 20—20 and 21—21, FIG. 19) represent other views of the motor, clutch, and relay structures of FIG. 19.

Figure 22A:
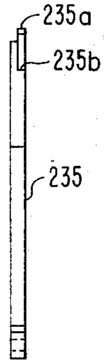
Figure 22B:
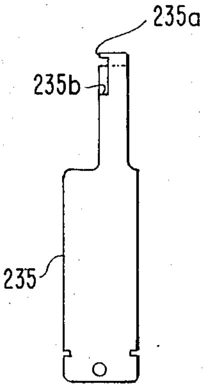

FIGS. 22*a* and 22*b* illustrate in greater detail an armature member used in the structures of FIGS. 19–21.

DETAILED DESCRIPTION

Disc Dictation Machine

FIG. 1 illustrates a magnetic disc dictation machine 1 having a microphone 2 and various facilities that are comparable in some respects to those set forth in the Becker apparatus and adapted for accommodation of disc record media in an automatic fashion as will presently be described. It should be understood that the principles set forth herein are also adaptable for use in conjunction with the disc type machines of Dollenmayer and Perkins, et al., in the aforementioned related IBM pending patent applications. The dictation apparatus of FIG. 1 makes use of disc loading and unloading mechanisms such as those illustrated in FIGS. 15–16 or as illustrated in FIGS. 17–22*b*. These comprise two stations 6 and 7 for entry and ejection of discs during operation, and a record/playback station 8 intermediate stations 6 and 7, and shown in greater detail in FIGS. 17–22*b*.

The dictation unit 1, FIG. 1, comprises various controls and operating elements as set forth below:

Cord Retract Button 10
Voice Level Indicator 11
Index Scale 12
Volume Control 13
Dictate Bar 15
Tuning Lever 16
Forward Space Key 17
Machine Speaker, not shown
Operating Key 21
Microphone Speaker 22
Scanner 24
Index Key 26
Feed Button 27

Reference is made to the Becker and Wehmer, et al., patent applications for a description of the various items listed.

As a matter of convenience, a typical operation of the dictation machine of FIGS. 1 and 2 will be described with reference particularly to FIGS. 3*a*, 3*b*, and 4 and 17–22*b*. In preparing for dictation, the dictator makes use of the disc loading/unloading mechanisms shown particularly in FIGS. 17–22*b*. These contemplate manual loading and automatic feeding of discs by depressing feed button 27, FIG. 1. As an alternative, the machine may be equipped with the manual feeding structures of FIGS. 15 and 16.

Also in preparation for the dictation of material, the dictator moves the keybutton 21 to the upper "Record" position. This moves a switch assembly 60, FIG. 4, into the record or "R" position to prepare the dictation circuits for recording. This activates the dictate relay 61 and conditions the circuits so that audio inputs to microphone 2 are routed through an input transistor circuit 65 and amplifier 66, and an output transformer 67 to a magnetic sound head 70 for recording on the disc 4. The routing of the signals during recording is fairly apparent by inspection of the circuit of FIG. 4. The actual recording of dictated material takes place when the dictator depresses dictate bar 15 to activate motor 75 and a disc drive block 76 in order to drive disc member 4. The apparatus has the usual power supply 77 which may be activated by on-off switch 80 (not shown in FIG. 1) and necessitating the continued closure of disc switch 81 and limit switch 82 representing the presence of the disc and the end of disc recording, respectively. An oscillator circuit 85 provides the usual high frequency bias signal for application to magnetic sound head 70 and in order to establish greater linearity of the recorded signal. The dictation unit also includes a backspace solenoid 86 that is operable each time the keybutton 21 is moved to the lowermost Reverse (Rev) position to back step sound head 70 in relation to disc 4 in order to review previously dictated material. Keybutton 21 on microphone 2 is spring loaded to the center Listen (Lis) position which corresponds to a Playback position of switch 60 in FIG. 4 designated "P." In this position, a Playback relay 87 is energized instead of Dictate relay 61. Thereupon, motor 75 is energized to activate disc drive 76 and rotate disc 4 with respect to sound head 70. The dictator can review previously dictated material.

Disc Recording and Indexing

Disc 4 is shown in greater detail in FIGS. *3a* and *3b*. Typically, during recording a spiral track comprising sections 4*a*, 4*b*, and 4*c* is recorded on disc 4. It is understood that these track portions forming a helical or spiral path are merely representative portions of an entire track that extends from the outer periphery to the inner section of disc 4. Such track can be considered as starting near the center of disc 4 and proceeding toward the outer periphery or vice versa, depending upon design requirements.

FIG. 3*b* illustrates an indexing operation making use of disc 4 and having the same track portions 4*a*, 4*b*, and 4*c*. In accordance with the Becker application, when the dictator has reached a point where he feels it necessary to issue instructions to the transcriber, he depresses dictate bar 15 to close the corresponding switch in FIG. 4 as well as index button 26 on microphone 2, closing the corresponding switch 26, FIG. 4. This activates a tone oscillator 90 that provides a tone of predetermined frequency characteristic to output transformer 67 for super-imposition on the disc along with the regular amplified voice signals from the microphone. This is represented schematically in track portion 4*b* of disc 4, FIG. 3*b*.

Upon completion of recording of the entire material on the particular disc presently in use, the dictator operates feed button 27 to initiate feeding of a new disc into position for recording. It is understood that index button 26 on microphone 2 may have more than one position in order to enable the superimposition of an end-of-letter tone on disc member 4 in accordance with the teachings in the Langendorf, et al. U. S. Pat. No. 3,288,941. The disc dictation unit of FIG. 1 offers an advantage, however, since it is possible to record each individual letter or document on an individual disc. This eliminates the necessity for marking ends of letters on the disc since only one letter or piece of dictated material occupies one disc.

After completing recording of one disc, or several discs, as may be required, the dictator will then convey the disc or group of discs to a transcriptionist for preparation of a typed copy during transcribing operations.

Transcribing Operations

FIG. 5 illustrates a possible disc transcribing unit that is generally laid out in accordance with the Wehmer, et al. transcribing unit but that is adapted for automatic high speed or manual feeding of discs as well as loading of discs at station 6*a* and unloading of discs at station 7*a*, with a record/playback at station 8*a* corresponding to stations 6–8 in FIG. 1. Transcribing unit 100 has an associated head set 101 and a foot control 102 the operation of which are described in applications heretofore referenced and, particularly, in various manuals and publications noted therein.

For convenience, the various controls on transcribing unit 100, FIG. 5, are set forth below:

Volume Dial 106
Feed Button 107
Tuning Lever 108
Cord Retract Button 109
Scanner 110
Tone Dial 112
Speed Dial 113
Recall Lever 114

Reference is made to the various patent applications, such as the Wehmer, et al., application, for a description of control members such as those illustrated in FIG. 5.

Preparation for Transcription

Upon receipt of a disc cartridge, the typist positions the cartridge next to station 6*a* and manually loads the discs into the machine. Discs are automatically fed with the mechanisms of FIGS. 17–22*b* or manually fed with the mechanisms of FIGS. 15 and 16, when provided. The operator initiates an automatic feeding operation by depressing button 107, using the mechanisms of FIGS. 17–22*b* and in a manner comparable to that for the dictation unit of FIG. 1. In contrast with the dictation unit, the transcribing unit has a playback mode only as illustrated in FIG. 6. Thus, if the equipment is turned on by on-off switch 120, not shown in FIG. 5, but shown in FIG. 6, power supply 121 is activated. The transcribing unit 100 includes a limit switch 125 and a disc switch 126 that serve functions corresponding to similar switches in the dictation unit. A motor 130 is connected to a disc drive block 131 to drive disc 4. This occurs when transcribe relay 135 is activated upon depression of foot control 102 and particularly in a direction to operate the transcribe (Trans) switch contacts in the foot control.

If a tone is recorded at the end of all dictated material, this may be detected by the transcriptionist to determine how much material has been recorded. Also, if more than one letter is recorded, a non-superimposed tone can be recorded at the end of each letter and indicates how long each letter is. In either case, reference is made to the index scale to determine how many minutes worth of material is involved.

Disc Cartridge

The present apparatus makes use of a disc cartridge, such as that described in the Campbell, et al., application, concurrently filed herewith. This disc cartridge is preferably of the form shown in FIG. 7, and is further shown in detail in FIGS. 8–12. Provision is made for manual ejection and loading of a plurality of discs, i.e., a "stack" of discs.

In FIG. 7, cartridge 30 has an upper planar surface 32 and a lower planar surface 33 forming an eject opening 35. An input slot 36 is arranged in a location on the right side of the cartridge, FIG. 7.

Cartridge 30 incorporates a disc retainer spring 37 serving to retain discs in the cartridge. In addition, cartridge 30 incorporates a guide spring 38 having a "goose neck" appearance and positioned in the right rear corner of cartridge 30. Spring 38 extends forwardly and inwardly and exerts slight pressure on any disc stored in cartridge 30. Spring 38 may be seen to better advantage in FIGS. 9, 11, and 12. Discs are inserted individually through slot 36 to the interior of cartridge 30 and are intended for ejection through opening 35 into any apparatus with which the cartridge is associated, such as that set forth in the present case. Cartridge 30 incorporates a slot 40 and a channel 41 accommodating a kicker 43 and associated slider knob 44. Knob 44 has an extension 46 arranged for insertion in slot 47 of kicker 43. In an assembled state, knob 44 and kicker 43 slide backwardly and forwardly in slot 40 and channel 41 from the rear of cartridge 31 toward the front eject opening 35, and vice versa.

Operation of the cartridge in FIGS. 7–12 is best seen in FIG. 8 where a disc 50 moves as indicated by arrow 51 through slot 36 to the interior of cartridge 30. During ejection, a disc or stack of discs is moved out from cartridge 30 preferably at a right angle with movement as indicated by arrow 53 and disc 54. The embodiment of FIGS. 7–12 is particularly intended for manual operation and as can be visualized, when a plurality of discs are stored in the cartridge, the surface **43*a* of kicker 43 is co-extensively positioned in a vertical direction so that it will contact any disc in the cartridge and move the same or plurality of discs out of the cartridge through eject opening 35. A plurality of discs 55 are shown in position in cartridge 30 in FIG. 12 with spring 38 resting on top of the stack maintaining a slight pressure thereon. It is assumed that all discs have been moved out of the cartridge in FIG. 11 and spring 38 thereupon drops to rest on lower planar surface 33 rather than in its upward position shown in FIG. 12.**

In order to enable the insertion of a large number of discs back into cartridge 30, kicker 43 is provided with a double incline plane portion **43*b* that is best seen in FIGS. 7 and 9 and that is arranged for cooperation with a portion 38*a* of spring 38. The user of the cartridge slides knob 44 and kicker 43 in slot 40 until the high portion of incline surface 43*b* is under portion 38*a* of spring 38. This raises spring 38 sufficiently so that a number of discs can then be inserted through eject opening 35 back into storage in cartridge 30.**

Alternatively, portion **38*b* of spring 38 can be formed upwardly so that when spring 38 is in its lowermost position shown in FIG. 11, portion 38*b* touches or proximates the bottom surface of upper planar surface 32, thereby allowing sufficient room for a plurality of discs to be inserted into cartridge 30 through opening 35.**

From the foregoing, it is evident that a cartridge structure is provided that enables convenient processing of record members.

Spindle Structures and Precise Registration of Discs

FIG. 13 illustrates spindle structures that are incorporated in the dictation apparatus of FIG. 1 or transcribing apparatus of FIG. 5 to insure precise registration of any disc fed into the record/playback station of the apparatus. The objective of these structures is to register the disc record member with a high degree of accuracy in order to prevent any off-track condition from occurring during scanning of individual tracks on the record member. This is essential due to the narrow track width and close interspacing of tracks, and if this is not done, it is manifested by loss of signal and crosstalk. To insure accurate registration, a small clearance is maintained between the registration hole in the disc and the spindle hub. Disc registration is accomplished by locating the disc on the spindle as shown in FIG. 13. A typical prior arrangement for disc registration is shown in FIG. 14 in which registration is accomplished by locating the disc on the spindle with a cap member 150.

If the disc hole is oversized compared to the spindle hub, the disc can shift laterally on the spindle during record or playback operations resulting in an off-track condition. In a typical case, due to the extremely close interspacing of tracks, the maximum allowable clearance between the disc hole and spindle hub must be 0.001. Difficulty is encountered in holding dimensional tolerances when working with the disc. To eliminate the critical nature of the disc hole to spindle hub tolerances, the structures can precisely register a disc with realistic tolerances of ±.005 on the disc hole diameter. When the disc is registered, no clearance exists between the disc hole and spindle hub, and the disc is securely clamped into position.

Referring to FIG. 13, spindle 151 is able to rotate and slide vertically on the spindle shaft 152. A spindle compression spring 153 provides an upward thrust on the spindle. A spindle cap 154 and worm 155, pressed together in a sub-assembly operation, can slide vertically on the spindle outer surface. A spindle cap compression spring 156 provides an independent upward thrust on the spindle cap assembly 154 and 155. A drive pin 157 is pressed into the spindle cap assembly. The vertical height of the spindle cap assembly on the spindle is limited by a coupler pin 158 which is pressed into the spindle cap assembly and is able to slide vertically in a slot 159 in the spindle. The coupler pin also constrains the spindle to rotate with the spindle cap assembly. As a disc 160 is driven at the pinch roller, it drives the spindle cap assembly through the drive pin which is engaged in the disc drive hole 161. The spindle is constrained to rotate with the spindle cap assembly. The worm 155 drives a worm gear, leadscrew and head carrier. A spindle upstop 162 mounted in a bearing 163 limits the vertical motion of the entire assembly.

During feeding of a disc into position, the spindle cap assembly 154, 155 is lowered vertically by a spindle depress pawl which pushes down on the spindle cap depress surface 164. The coupler pin 158 bottoms in the spindle slot 159 forcing the spindle down. In the lowered position a brake arm prevents the spindle cap assembly from rotating by restraining the spindle cap through detents in the brake surface 165. In this position the spindle cap assembly and spindle are below a station plate 166. As a disc is loaded in and centered over the spindle, the spindle depress pawl is released allowing the spindle and spindle cap assembly to slide upward under spring action. The spindle registration surface 167 (conical section) moves up into the disc registration hole until it is fully seated in the hole. The spindle cap assembly moves up until the drive pin 157 touches the bottom of the disc. At this point the brake arm still restrains the spindle cap assembly from rotating. The disc is driven in a high speed reverse mode until the disc drive hole 161 aligns with the drive pin 157 at which time the drive pin pops into the hole allowing the spindle cap to clear the brake arm and clamp the registered disc between the spindle cap 154 and the upstop 162. The disc, spindle cap assembly, spindle, and upstop continue to rotate as a unit.

During an unload operation, the spindle depress pawl is actuated, which lowers the spindle cap assembly and spindle below the surface of the play station plate. The disc is then stripped off the spindle by the play station plate and ejected.

An advantage of this design over other designs for disc registration is that any size disc registration hole within practical tolerance limits, such as ±.005, can be precisely registered with zero clearance between the spindle and disc registration hole. Secondly, the disc is securely clamped into this position after registration has been accomplished. Therefore, disc hole punching tolerances and temperature and humidity effects on the hole size are no longer critical. Thirdly, by using a longer spindle bearing length in this design the alignment of the spindle on the shaft is less critically dependent on the spindle-to-shaft clearance.

With this design, the off-track condition is corrected, and loss of signal and annoying cross-talk are eliminated.

It is to be noted that the disc record member is driven by a rim-drive as set forth in the Dollenmayer case and through drive pin 157 rotates worm gear 155 that is coupled to a leadscrew, not shown herein, but fully described and illustrated in the Dollenmayer. The leadscrew, in turn, drives a magnetic head in order to trace a spiral path for recording or playing back of signals with respect to the disc record member.

Super-imposed upon the spindle structures of FIG. 13 is a bell crank member 170 mounted on stud 171 for rotation as indicated by arrows 173 and 174. Bell crank 170 has extending fingers **170*a* and 170*b* that straddle the spindle cap depress surface 164. Finger 170*b* lies behind finger 170*a* as viewed in FIG. 13. The disc carrier assembly includes a cam member 180 that operates against lower extremity 170*c* of bell crank 170 during movement of the carrier assembly to the right in the apparatus. The camming action of cam surface 180 moves portion 170*c* in the direction of arrow 173 and correspondingly moves the finger portions 170*a* and 170*b* downwardly as indicated by arrow 174 to move spindle registration surface 167** out of the way in order that a disc record member can be moved into position for registration.

Operation of Manual Loading, Manual Feeding Structures of FIGS. 15 and 16

FIGS. 15 and 16 illustrate a first version of loading, feeding, and unloading structures according to the present invention. This is a useful embodiment, but for purposes of the present case, it is assumed that the apparatus of FIGS. 1 and 5 are provided with the second version of FIGS. **17–22*b*** to be discussed shortly.

Referring to FIGS. 15 and 16, a stack of discs or an individual disc is inserted between the disc weight 200 and the loader plate 202 either by hand or from a cartridge. The loader carrier 203 is moved along the carrier guide shafts 205 from the extreme left toward the right. As the loader carrier moves toward the right, picker 206 peels the bottom disc off the stack of discs in Station 1 and pushes it through the stripper plate 208 toward Station 2; the spindle depress actuator works through a linkage on the head drive mechanism to cam the spindle and the sound head down to clear a path for the disc to move into Station 2, as previously discussed. Also, a cam surface on the loader carrier works through a linkage on the head drive mechanism to cam the lead screw pawl out of the lead screw and to release the phasing switch. The latter structures are not shown in detail. To insure that the disc is properly positioned in Station 2, a " full stroke" mechanism is provided to force the operator to move the loader carrier 203 to its extreme right hand position before moving it back toward the left. This mechanism consists of a brake 211, a bias spring 212, a slider 214 to position the brake, and two adjustable stops 216 and 217 to position the slider. After reaching the extreme right hand position, the loader carrier is moved back to the extreme left hand or home position. This motion through the interaction with the head drive and scan mechanisms restores the sound head to its starting position, allows the spindle, FIG. 13, to move up through the center hole in the disc, the sound head to move up into contact with the disc, and the lead screw pawl to engage the leadscrew. To eject the recorded disc and load another disc, the above procedure is repeated. As the loader carrier 203 moves toward the right hand position, the eject actuator bellcrank 221 is actuated causing the eject kicker 230 to move out and down pushing the disc either down into the exit hopper (Station 3) or into a cartridge that has been inserted into Station 3 and positioning the kicker below the level of the disc that has been moved into Station 2. As the loader carrier 203 reaches its home position bellcrank 221 is again actuated causing kicker 220 to be positioned back up ready for the next load-eject cycle.

In the event no cartridge is in position in the machine, the disc eject spring 223 pushes a disc coming into Station 3 toward the front of the machine for removal by the operator. Disc spring 224 maintains a slight pressure on a disc in Station 3 as it moves toward the front to prevent the disc from moving out of Station 3 until the operator wants to remove it.

Of further interest is the end of cycle switch 225 which informs the electronics of the machine that the feeding cycle is complete and that the machine can now phase the disc as described in the Dollenmayer application.

Manual Loading and Automatic Feeding with Structures of FIGS. **17–22*b*.**

The structures of FIGS. **17–22*b* facilitate automatic feeding of discs from station to station in the apparatus and are particularly useful in the case of a system environment where an operator is remotely situated with respect to the central recorder and can not observe the status of the discs as they are processed in the apparatus. However, it is also assumed that the apparatus of FIGS. 1 and 5 are provided with these structures, rather than the structures of FIGS. 15 and 16. The characteristics and functions of the majority of elements shown in FIGS. 17 and 18 corresponds with similar elements in FIGS. 15 and 16 and comparable reference numerals are used. The disc loader carrier 203***a* has a projecting pin 225 arranged for engagement by slot 230*a* of a spring loaded changer actuater arm 230, FIG. 19. The motion required to change discs is transmitted from the auto changer to the disc changer through this arm and pin connection. This is in contrast with the changer handle 204 extending toward the front of the machine as shown in FIG. 15 for grasping by the operator in order to move the carrier 203 from left to right and vice versa.

Initially, pin 245 on clutch cam plate 246 rests against stop 235*b* of magnet armature 235, FIG. 22*b*. An electrical impulse with a time duration slightly longer than one change cycle is supplied to clutch magnet 231 and a.c. motor 233 causing the magnet armature 235 to release clutch 237 coupling clutch arbor 239, and thus the drive bracket assembly 240, to the drive gear 241 which is turned by the gear train from the a.c. motor. As drive bracket 240 rotates, changer arm 230 is forced to swing over the back causing the disc changer to change discs. Just as clutch arbor 239 completes one revolution, pin 245 on clutch cam plate 246 contacts the first stop position 235*a* on the magnet armature 235, FIGS. 22*a* and 22*b*, which causes the clutch cam plate 246 to cam the ratchet pawl 250 out of engagement with the ratchet on drive gear 241 and allows drive gear 241, idler gear 251 and motor 233 to turn independently of the clutch arbor 239. The spring loaded arm 230 stops in a prescribed position. When the time duration of the electrical impulse mentioned above is over motor 233 stops and magnet armature 235 moves back to its de-energized position which lets pin 245 on clutch cam plate 246 move over to the second stop position 235*b*, its original position, and the cycle is complete.

The motion transmitted from the auto loader mechanism to the disc changer mechanism is close to that which would be considered ideal for changing discs in that the changer velocity is relatively low when picking up and positioning the disc and the return portion of the cycle is quicker than the feeding portion.

The modular construction of the mechanism makes it a simple matter to convert the disc changer on a machine from manual to automatic.

While the invention has been shown and described in connection with several embodiments thereof, it will be understood by those skilled in the art that various changes in form and detail may be made without departing from the spirit of the invention.

What is claimed is:

1. A method for processing in a utilization device a record member customarily stored in a cartridge, said utilization device having a plurality of stations arranged in succession therein, said stations comprising a load station, a utilizing station and an unload station, in that order and arranged for feeding of a record member from one station to the next along a predetermined generally linear path, comprising the steps of:

A. positioning said cartridge at said load station at right angles to said linear path;

B. moving a said record member from said cartridge into said load station in a direction generally transverse to said linear path;

C. removing said cartridge from said load station;

D. positioning said cartridge at said unload station in a direction generally transverse to said linear path for return of a said record member into said cartridge;

E. and feeding said record member along said linear path from said load station into said cartridge at said unload station.

2. A method for processing in a utilization device a plurality of record members customarily stored generally in superimposed relation in a cartridge, said utilization device having a pluraltiy of stations arranged in succession therein, said stations comprising a load station, a utilizing station and an unload station, in that order and arranged for feeding of each of said record members from one station to the next along a predetermined generally linear path, comprising the steps of:

A. positioning said cartridge at said load station at right angles to said linear path;

B. moving said plurality of record members from said cartridge into said load station in a direction generally transverse to said linear path;

C. removing said cartridge from said load station;

D. positioning said cartridge at said unload station in a direction generally transverse to said linear path for return of said plurality of record members into said cartridge;

E. and feeding said record members along said linear path from said load station to said utilizing station and thence into said cartridge at said unload station.

3. A method for processing in an audio device a record member customarily stored in a cartridge, said audio device having a load station, a transducing station and an unload station, comprising the steps of:

A. positioning said cartridge at said load station;

B. moving said record member from said cartridge into said load station;

C. removing said cartridge from said load station;

D. positioning said cartridge at said unload station for return of said record member into said cartridge; and E. feeding said record member from said load station to said transducing station and thence to said unload station for return into said cartridge.

4. A method for processing in an audio device a plurality of record members customarily stored generally in superimposed relation in a cartridge, said audio device having a load station, a transducing station and an unload station, comprising the steps of:

A. positioning said cartridge at said load station;

B. moving said record members from said cartridge into said load station;

C. removing said cartridge from said load station;

D. positioning said cartridge at said unload station for return of said record members into said cartridge; and E. feeding each of said record members from said load station to said transducing station and thence to said unload station for return into said cartridge, the arrangement being such that a record member is fed from said load station to said transducing station concurrently with feeding of a different record medium from said transducing station to said unload stations.

5. A utilization device for processing a record member customarily stored in a cartridge, said utilization device having a plurality of stations arranged in succession therein, said stations comprising a load station in that order and arranged for feeding of a record member from one station to the next along a predetermined generally linear path, comprising:

A. means for positioning said cartridge at said load station at right angles to said linear path;
B. means for receiving a said record member from said cartridge at said load station in a direction generally transverse to said linear path; .
C. means for positioning said cartridge at said unload station in a direction generally transverse to said linear path for return of a said record member into said cartridge;
D. and means for feeding said record member along said linear path from said load station into said cartridge at said unload station.

6. A utilization device for processing a plurality of record members customarily stored generally in superimposed relation in a cartridge, said utilization device having a plurality of stations arranged in succession therein, said stations comprising a load station, a utilizing station and an unload station in that order and arranged for feeding of each of said record members from one station to the next along a predetermined generally linear path, comprising:

A. means for positioning said cartridge at said load station at right angles to said linear path;
B. means for receiving said plurality of record members from said cartridge at said load station in a direction generally transverse to said linear path;
C. means for positioning said cartridge at said unload station in a direction generally transverse to said linear path for return of said record members into said cartridge;
D. and means for feeding said record members along said linear path from said load station to said utilizing station and thence into said cartridge at said unload station.

7. An audio device for processing a record member customarily stored in a cartridge, said audio device having a load station, a transducing station and an unload station comprising:

A. means for positioning said cartridge at said load station;
B. means for receiving said record member from said cartridge at said load station;
C. means for positioning said cartridge at said unload station for return of said record member into said cartridge; and
D. means for feeding said record member from said load station to said transducing station and thence to said unload station for return into said cartridge.

8. An audio device for processing record members customarily stored generally in superimposed relation in a cartridge, said audio device having a load station, a transducing station and an unload station, comprising:

A. means for positioning said cartridge at said load station;
B. means for receiving said record members from said cartridge at said load station;
C. means for positioning said cartridge at said unload station for return of said record members into said cartridge; and
D. means for feeding each of said record members from said load station to said transducing station and thence to said unload station for return into said cartridge.

9. A method for processing in an audio device a disc record member customarily stored in a cartridge, said audio device having a load station, a transducing station and an unload station, and said cartridge having an eject aperture for ejection of said disc record member in a first direction and and an entry aperture for receipt of said disc record member in a second direction, at substantially right angles to said first direction, comprising the steps of:

A. positioning said cartridge at said load station with said eject aperture toward said load station;
B. moving said disc record member from said cartridge into said load station;
C. removing said cartridge from said load station;
D. positioning said cartridge at said unload station with said entry aperture located for return of said disc record member into said cartridge; and
E. feeding said disc record member from said load station to said transducing station and thence to said unload station for return into said entry aperture of said cartridge.

10. A method for processing in an audio device a plurality of disc record members customarily stored generally in superimposed relation in a cartridge, said audio device having a load station, a transducing station and an unload station, and said cartridge having an eject aperture for ejection of said disc record members in a first direction and an entry aperture for receipt of said disc record members in a second direction at substantially right angles to said first direction, comprising the steps of:

A. positioning said cartridge at said load station with said eject aperture toward said load station;
B. moving said disc record members from said cartridge into said load station;
C. removing said cartridge from said load station;
D. positioning said cartridge at said unload station with said entry aperture located for return of said disc record members into said cartridge; and
E. feeding each of said disc record members from said load station to said transducing station and thence to said unload station for return into said entry aperture of said cartridge, the arrangement being such that a disc record member is fed from said load station to said transducing station concurrently with feeding of a different disc record member from said transducing station to said unload station.

11. A utilization device for processing a disc record member customarily stored in a cartridge, said utilization device having a plurality of stations arranged in succession therein, said stations comprising a load station, a utilizing station, and an unload station, in that order and arranged for feeding of a disc record member from one station to the next along a predetermined generally linear path, and said cartridge having an eject aperture for ejection of said disc record member in a first direction and an entry aperture receipt of said disc record member in a second direction at substantially right angles to said first direction, comprising:

A. means for positioning said cartridge at said load station at right angles to said linear path with said eject aperture toward said load station;

B. means for receiving a said disc record member from said cartridge at said load station in a direction generally transverse to said linear path;

C. means for positioning said cartridge at said unload station in a direction generally transverse to said linear path with said entry aperture located said disc record member into said cartridge;

D. and means for feeding said disc record member along said linear path from said load station to said utilizing station and thence into said cartridge at said unload station.

12. A utilization device for processing a plurality of disc record members customarily stored generally in superimposed relation in a cartridge, said utilization device having a plurality of stations arranged in succession therein, said stations comprising a load station, a utilizing station and an unload station in that order and arranged for feeding of each of said disc record members from one station to the next along a predetermined generally linear path, and said cartridge having an eject aperture for ejection of said disc record members in a first direction and an entry aperture for receipt of said disc record members in a second direction at substantially right angles to said first direction, comprising:

A. means for positioning said cartridge at said load station at right angles to said linear path with said eject aperture toward said load station;

B. means for receiving said plurality of disc record members from said cartridge at said load station in a direction generally transverse to said linear path;

C. means for positioning said cartridge at said unload station in a direction generally transverse to said linear path with said entry aperture located for return of said disc record members into said cartridge;

D. and means for feeding said disc record members along said linear path from said load station to said utilizing station and thence into said entry aperture of said cartridge at said unload station.

13. The device of claim 12 wherein said feeding means is operative in successive cycles to feed disc record members and further comprising:

operator controlled means for initiating said successive cycles of operation of said feeding means.

14. The device of claim 12 further comprising:

manual control means interconnected with said feeding means and positioned for use by an operator to feed said disc record members.

15. Thp device of claim 12 further comprising:

automatic motorized means for operating said feeding means to feed said disc record members.

16. The device of claim 12 wherein said feeding means comprises:

plate means for retaining said disc record members in a plane for feeding movement in said device; and feed knife means operable to engage and feed each of said disc record members in succession through said device;

17. The device of claim 12 further comprising:

weight means at said load station for maintaining a slight pressure on disc record members at said load station; and spring means at said unload station operable in the absence of a cartridge at said unload station for maintaining slight pressure on disc record members feeding into said unload station tending to eject said disc record members to a convenient position for withdrawal from said device.

18. The device of claim 17 further comprising:

additional spring means at said unload station operable to control the rate of ejection of a disc record member from said unload station.

19. The device of claim 12 wherein said disc record members include a helical signal path and further comprising:

transducing means at said utilizing station, for transducing signals on a said disc record member;

means mounting a disc record member at said utilizing station;

and means for relatively moving said transducing means and a said disc record member to trace said helical signal path.

20. The device of claim 19 further comprising:

dictation adjuncts including a microphone interconnected with said device said microphone providing audio signals and means for converting audio signals from said microphone to signals suitable for recording in said signal path by said transducing means.

21. The device of claim 19 wherein said disc record members include signals representative of audio information stored in said signal path and further comprising:

transcription adjuncts including at least a headset interconnected with said device, for providing audible signals;

means for converting signals derived by said transducing means to signals for application to said headset.

22. The device of claim 19 further comprising:

spindle means associated with said mounting means for retaining a disc record member; and registration means incorporated in said spindle means for aligning a said disc record member prior to transducing operations.

23. The device of claim 22 wherein said relative moving means includes a drive pin and each of said disc record members includes a center aperture and a drive aperture positioned for driving engagement with said drive pin said registration means further comprises:

clamp means for clamping a said disc record member upon said mounting means to maintain an accurate registration of said drive aperture with respect to said center aperture to insure accurate tracking during transducing operations.

* * * * *

PO-1050
(5/69)

UNITED STATES PATENT OFFICE
CERTIFICATE OF CORRECTION

Patent No. 3,789,160 Dated January 29, 1974

Inventor(s) James D. Bruer, Donald L. Buddington, Walter F. Klein

It is certified that error appears in the above-identified patent and that said Letters Patent are hereby corrected as shown below:

Column 1, line 6, the word "IMB" should read --IBM--.

Signed and sealed this 9th day of April 1974.

(SEAL)
Attest:

EDWARD M.FLETCHER,JR.
Attesting Officer

C. MARSHALL DANN
Commissioner of Patents